United States Patent [19]
Debeneix

[11] Patent Number: 4,520,974
[45] Date of Patent: Jun. 4, 1985

[54] COMBINED FASTENING DEVICE FOR TRANSPORTING AND HOISTING A TURBOJET ENGINE

[75] Inventor: Pierre Debeneix, Saint Sauveur sur Ecole, France

[73] Assignee: S.N.E.C.M.A., Paris, France

[21] Appl. No.: 473,204

[22] Filed: Mar. 8, 1983

[30] Foreign Application Priority Data

Mar. 8, 1982 [FR] France .............................. 82 03807

[51] Int. Cl.$^3$ .............................................. B64D 27/00
[52] U.S. Cl. ..................................... 244/54; 294/67.1; 294/82.12
[58] Field of Search ............. 244/54; 294/81 R, 78 A, 294/67 R; 254/133 R; 414/590; 29/469

[56] References Cited

U.S. PATENT DOCUMENTS

| | | | |
|---|---|---|---|
| 1,941,395 | 12/1933 | Graves | 254/133 R |
| 2,587,345 | 2/1952 | Lombard | 244/54 |
| 2,815,184 | 12/1957 | Westphal et al. | 244/54 |
| 2,958,480 | 11/1960 | Sauliner | 244/54 |
| 3,146,016 | 8/1964 | Daymon, Jr. | 294/67 R |
| 3,268,093 | 8/1966 | Kerter | 414/590 |
| 3,348,309 | 10/1967 | Rohr | 294/78 A |
| 4,346,861 | 8/1982 | Legrand et al. | 244/54 |
| 4,412,774 | 11/1983 | Legrand et al. | 244/54 |

Primary Examiner—Galen L. Barefoot
Attorney, Agent, or Firm—Oblon, Fisher, Spivak, McClelland & Maier

[57] ABSTRACT

The device includes means for transporting and hoisting an engine. The device has common elements constituted by two straps fixed to the housing on a horizontal diameter. The strap fixing lugs have coaxial bores. Each strap receives a removable sleeve which cooperates on its outer surface with the fixing lug bores and with one of the holes of a rod. The other hole of the small rod cooperates with the hoisting means. An element belonging to the transporting means axially transverses the sleeve and retains it in a strap of the transport truck.

3 Claims, 6 Drawing Figures

COMBINED FASTENING DEVICE FOR TRANSPORTING AND HOISTING A TURBOJET ENGINE

BACKGROUND OF THE INVENTION

1. Field of the Invention

The present invention concerns a combined fastening device for transporting a turbojet engine and hoisting it into an airframe. The fastening device has fixation elements for fixation to the transport truck and means for hoisting of the unit into position in the airframe.

2. Description of the Prior Art

The main housing of a turbojet engine conventionally carries a number of elements located in symmetric pairs in relation to the vertical plane of symmetry of the housing and intended for the fixation of the unit to a transport truck used for placing and removing the unit into and from the airframe as well as for its longitudinal positioning. Also provided are elements for the fixation of hoisting means allowing lifting or setting up of units onto the transport truck and its placing in a vertical direction for fixing to the airframe, and for the fixation of units to the airframe, e.g. by means of small rods.

Due to the specificity of each pair of elements, they are distributed over a large angular sector of the housing, which requires a reinforcement of this entire area. The consequences are a poor distribution of stress and an increase in the mass of the turbojet engine.

Attempts have been made to simplify and lighten the fixing and hoisting systems. Thus, French Pat. No. 2,326,327 describes a device which permits the vertical movement of a turbojet engine using a single element. This element is compounded with a peg fixed to the top of the engine housing. The peg has the function of centering the unit in relation to a bearing fixed to the upper part of the airframe. The peg is provided along its longitudinal axis with structure for fixing a hoisting device passing through the journal bearing and allowing the vertical placement or the removal of the engine by a winch. The unit is conventionally fixed to the airframe by lateral rods.

This device allows the elimination of a hoisting point and of a hoisting system independent of the assembly, but has the disadvantage of subjecting a small area of the housing to significant stresses.

French Pat. No. 2,453,779 discloses a device in which the fixing small rods and the hoisting element are merged together. The housing of the turbojet engine carries two small rods which are symmetric to its vertical plane of symmetry and are articulated to straps integral with the housing. The other end of each of the small rods cooperates with a connecting and raising assembly. This assembly has a nut and screw linear moving system on the small rod side and is suspended from the airframe by a spherical articulation.

Aside from the reduction in the number of elements necessary for fixing and raising, this device does not take up much space and allows a reduction of dead spaces in comparison with conventional fixation devices.

SUMMARY OF THE INVENTION

The invention also intends to provide a device for transporting and hoisting a turbojet engine, the device having a reduced number of elements which assures a better distribution of stress on the engine casing and also allows a number of arms to be freed for accessory functions.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENTS

Figure 1:
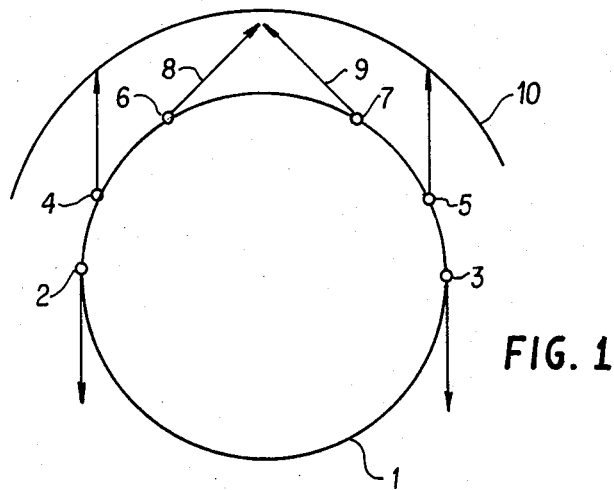
FIG. 1 schematically shows the known arrangement of the fixing elements for the transport means, hoisting means and fixing small rods.

FIG. 1 schematically shows the classic arrangement of fixation elements on the housing of a turbojet engine as seen along the axis of the engine. Housing 1 carries two elements 2 and 3 on its horizontal diameter and to which the transport means are attached. These transport means can be compounded with rollers rolling on rails laterally fixed to opposite sides of the airframe, or of the ends of the arms of a truck moving along a track provided, for example, in the lower part of the airframe. The upper part of the housing carries four elements 4 and 5, and 6 and 7, which are in symmetric pairs in relation to the vertical plane of symmetry of the engine. Elements 4 and 5 receive the hoisting means, thereby allowing the release of the transport means and the suspension of the housing from airframe 10 by means of elements 6 and 7 and associated fixing rods 8 and 9.

Although the stresses are suitably distributed in the housing skin by diametrically opposed fixation elements 2 and 3, this is not the case for hoisting elements 4 and 5, which necessitate a reinforcement of the housing. These elements 4 and 5 are generally reinforced by being fixed to the ends of two inner arms which cooperate with other arms to assure the rigidity of the main housing of the turbojet engine.

However, the need for cooling the rotor bearings without increasing the complexity of the engine has led the inventor to use these inner arms to bring in the cooling air. It is thus no longer possible to fix the hoisting elements to the end of these arms, and the movement of these elements would have necessitated further local reinforcement of the housing, which would be incompatible with construction requirements.

This difficulty was overcome by creating a combined fastening device for transporting and hoisting a turbojet engine.

The hoisting elements 4 and 5 (FIG. 1) have been lowered to coincide with elements 2 and 3 for the transport of the engine after disconnection from the airframe, in order to form a combined device.

Figure 2:
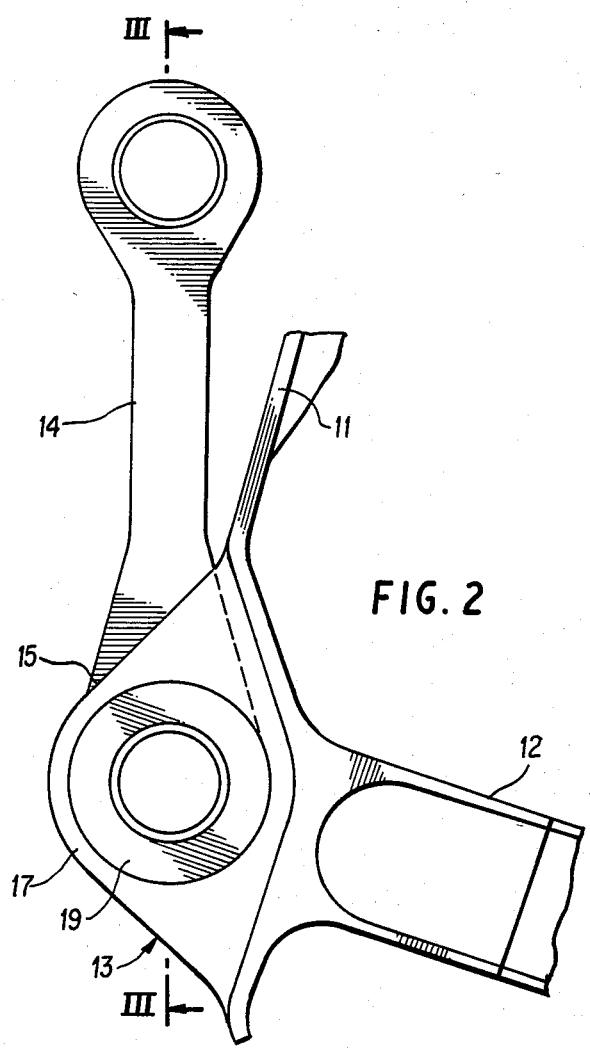
FIG. 2 is an elevation view of the fixing device for the transport means and the hoisting means according to the invention.

FIG. 2 shows in elevation an embodiment of an element of the device of the invention. A portion of the exhaust housing 11 of the engine has an inner arm 12, not used for cooling, which connects the inner shroud to the outer shroud of the housing. Strap 13 is fixed to the outer housing surface and to the end of arm 12. Head 15 of rod 14 is held between fixing lugs 16 and 17 of the strap by sleeve 18, the outer surface of which cooperates with coaxial bores provided in fixing lug 16 and 17 and with the hole in the head of small rod 14. The sleeve 18 is immobilized in the strap by collar 19 provided at one of its ends so as to be supported against fixing lug 17, and at its other end by elastic stop ring 20 which cooperates with groove 21 formed in the outer surface of the sleeve to form a stop opposite fixing lug 16.

The hole in the head 22 of small rod 14 receives a part of the hoisting means, thus permitting the vertical positioning of the engine.

The combined transporting and hoisting device is compounded with two elements as described above. Each such element is located on the housing at the horizontal diameter of the turbojet and connected by the strap 13 to elements belonging to the transport means which cooperates with the strap.

The unit is transferred by a truck which has a known, approximately U-shaped cradle. The ends of the shanks of the U have elements which permit the engine to be supported, at least temporarily, by the device of the invention which is fixed to the housing.

Figure 3:
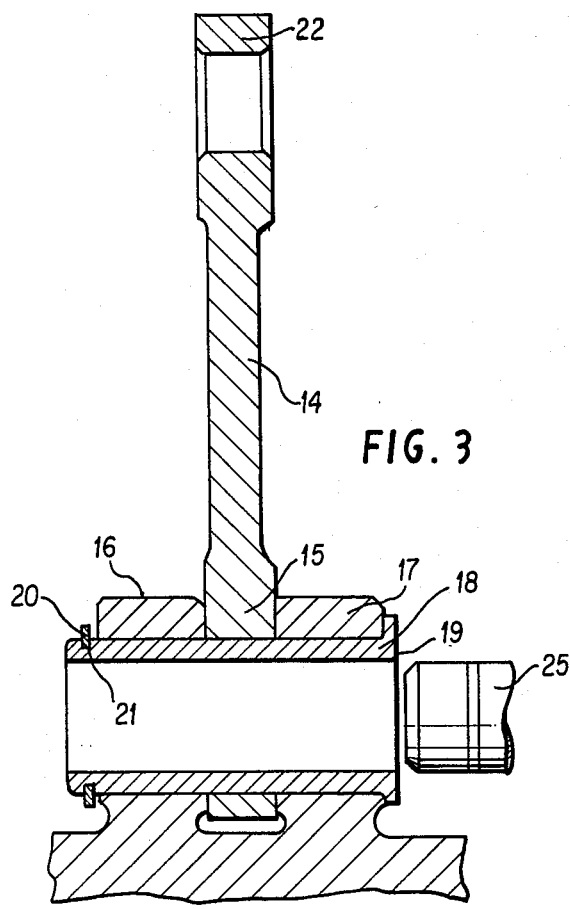
FIG. 3 is a section along line III—III of FIG. 2.
Figure 4:
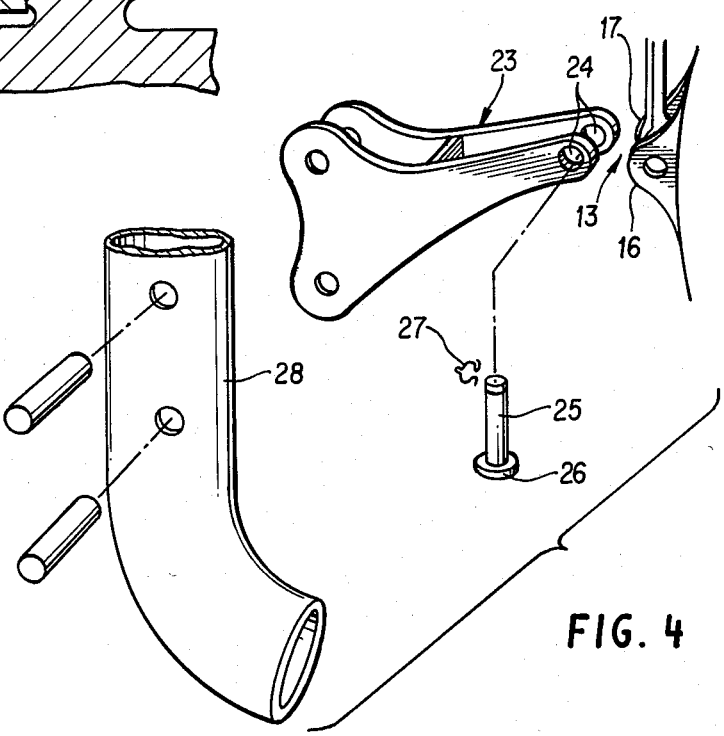
FIGS. 4, 5 and 6 are partial perspective view of different systems for fixing transport means to the device of the invention.
Figure 5:
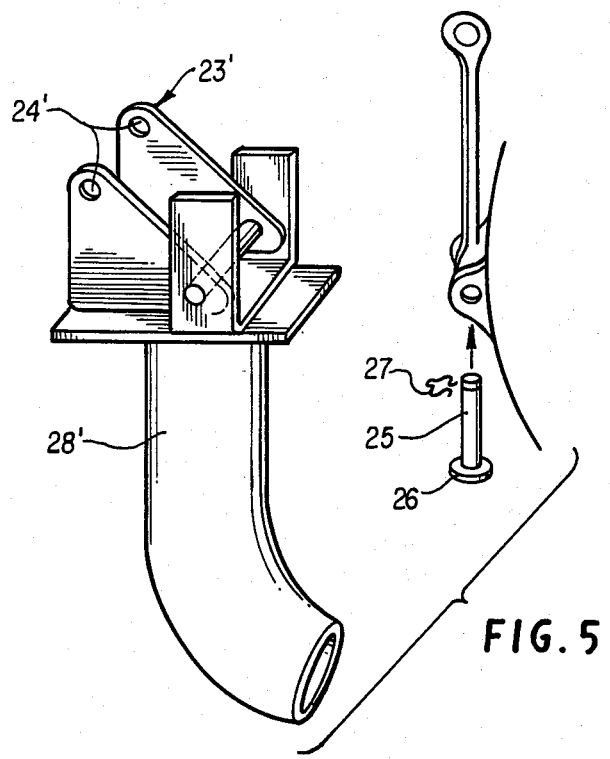
Figure 6:
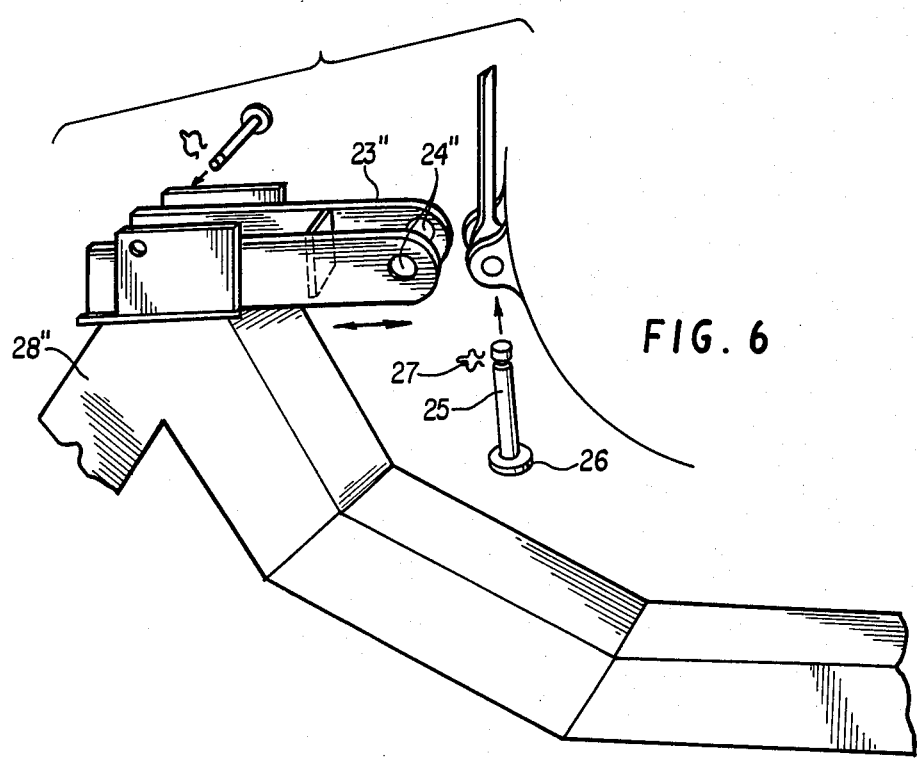

These cradle elements have a part shaped like clevises 23, 23' or 23" (FIGS. 4 to 6) which is placed at both sides of the fixing lugs 16 and 17 of the strap 13 fixed to the housing. Bores 24, 24' and 24" provided in the shanks of clevises 23, 23' and 23" correspond to bores provided in strap 13 with which they are placed in alignment, and receive a pin 25 with stop 26 at one end and clip 27 at the other. This axis 25 supports, through sleeve 18 (see FIG. 3), the weight of the engine, which is transmitted by clevises 23, 23' or 23" to arms 28, 28' or 28" of the truck.

The transporting and hoisting of a turbojet engine by the device of the invention is performed as follows: When the engine is fixed to the airframe by known small fixing rods, small rods 14 of the hoisting device are placed in straps 13 so as to put the hole of the rod head 15 in alignment with the bores of fixing lugs 16 and 17 of strap 13.

Sleeves 18 are then introduced into strap 13 and the holes of the heads 15 of small rods 14, and are fixed by means of their elastic rings 20. The free rod heads 22 are hooked to the hoisting means and the transport truck is brought into poistion under the unit. By acting on the hoisting means, after having disassembled the small fixing rods, the axis of sleeve 18 is brought into alignment with axes 24, 24' or 24" of the bores of straps 23, 23' or 23" provided at the ends of the truck arms. Axes 25 are then introduced into the assembly of sleeve 18 and strap 13, are locked longitudinally by clips 27 and the unit is then rested on the truck arms. Small rods 14 of the hoisting device are then disconnected from the hoisting means. The unit can then be removed from the airframe.

The unit is reassembled in the reverse manner, whereby the small rods 14 are mounted in the straps before the transport operations.

The combined device for transporting and hoisting a power unit has the following advantages: a certain number of radial arms are set free for other applications and especially for use as a cooling air passageway, a reduction of mass due to the elimination of the two fixation points for hoisting, and a better distribution of the hoisting stresses which act along the housing skin.

Obviously, numerous modification and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A combined fastening device for transporting and hoisting a turbojet engine into an airframe, said device comprising:
    two first straps, each said first strap being positioned at the intersection of a housing of said engine with the horizontal diameter thereof, each said first strap having spaced first fixing lugs including coaxial first bores;
    a rod for each said first strap, each said rod having one end positioned between said first fixing lugs, said one end having a first hole coaxial with said first bores, each said rod having a second end including a second hole adapted to receive engine hoisting means associated with said airframe;
    a sleeve inserted between each said first bores and first holes, the interior or each said sleeve being adapted to receive engine transporting means,
    said engine transporting means comprising:
    a pin insertable in said sleeve;
    a transport truck having an arm for each said first strap; and
    a second strap on each said arm, each said second strap having second fixing lugs including second bores positionable coaxial with said first bores, whereby each said pin can be simultaneously inserted in one said sleeve and said second bores.

2. The device of claim 1 wherein one end of each said sleeve includes a collar abutting one of said first fixing lugs of one said strap and wherein a second end of each said sleeve includes an elastic ring abutting the other of said first fixing lugs.

3. The device of claim 1 wherein each said pin has a stop at one end and a clip at the other end.

* * * * *